United States Patent [19]

Gondela et al.

[11] Patent Number: 4,774,143

[45] Date of Patent: Sep. 27, 1988

[54] IMPACT RESISTANT GLASS

[75] Inventors: Douglas P. Gondela, Colchester; Charles W. Lotz, Charlotte, both of Vt.

[73] Assignee: General Electric Company, Pittsfield, Mass.

[21] Appl. No.: 814,959

[22] Filed: Dec. 31, 1985

[51] Int. Cl.⁴ .................... B32B 3/10; B32B 17/10
[52] U.S. Cl. ........................ 428/442; 428/46; 428/48; 428/51; 428/428; 428/913
[58] Field of Search ............ 428/428, 442, 913, 34, 428/46, 48, 51

[56] References Cited

U.S. PATENT DOCUMENTS

| | | | |
|---|---|---|---|
| 2,319,534 | 5/1943 | Crowley | 428/46 |
| 3,616,115 | 10/1971 | Klimmek . | |
| 3,658,636 | 4/1972 | Beckmann et al. . | |
| 3,825,917 | 7/1974 | Lucky . | |
| 3,864,204 | 2/1975 | Shorr et al. . | |
| 3,867,239 | 2/1975 | Alesi et al. | 161/37 |
| 3,894,472 | 7/1975 | Davis . | |
| 3,928,708 | 12/1975 | Fohlen et al. . | |
| 4,068,840 | 1/1978 | Spaulding, Jr. | 272/3 |
| 4,081,581 | 3/1978 | Littell, Jr. | 428/138 |
| 4,243,719 | 1/1981 | Holmes | 428/411 |
| 4,277,294 | 7/1981 | Orcutt | 156/102 |
| 4,312,903 | 1/1982 | Molari, Jr. | 428/34 |
| 4,352,316 | 10/1982 | Medlin . | |
| 4,422,893 | 12/1983 | Duchateau et al. . | |

FOREIGN PATENT DOCUMENTS 2901951 7/1980 Fed. Rep. of Germany .
9274 1/1968 Netherlands .

Primary Examiner—John E. Kittle
Assistant Examiner—Patrick J. Ryan

[57] ABSTRACT

A transparent laminated window structure having high impact resistance is disclosed, wherein the window comprises a continuous inner layer of thermoplastic material, and an outer layer substantially parallel to the inner layer including at least a first course of discrete, mutually spaced glass segments, the spaces between adjacent segments containing an adhesive material. The window structure may further comprise a strip of elastomeric material compressed between the inner and outer layers so as to define a gas gap between the layers. A projectile contacting a particular glass segment in the outer layer will fracture that segment, but will not cause cracking in the adjacent, mutually spaced segments in the same course, and therefore, a high degree of visibility through the window structure will be retained after impact by the projectile.

22 Claims, 5 Drawing Sheets

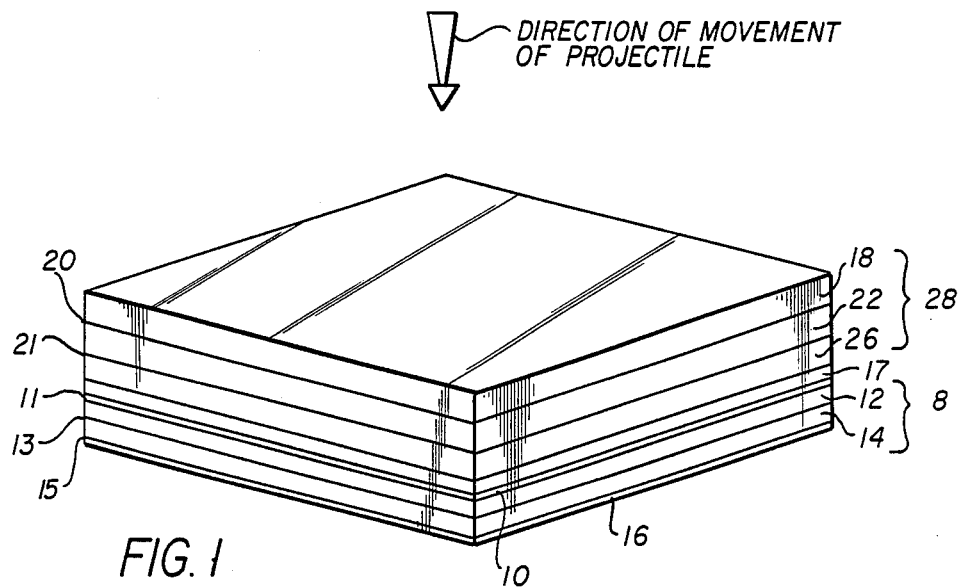
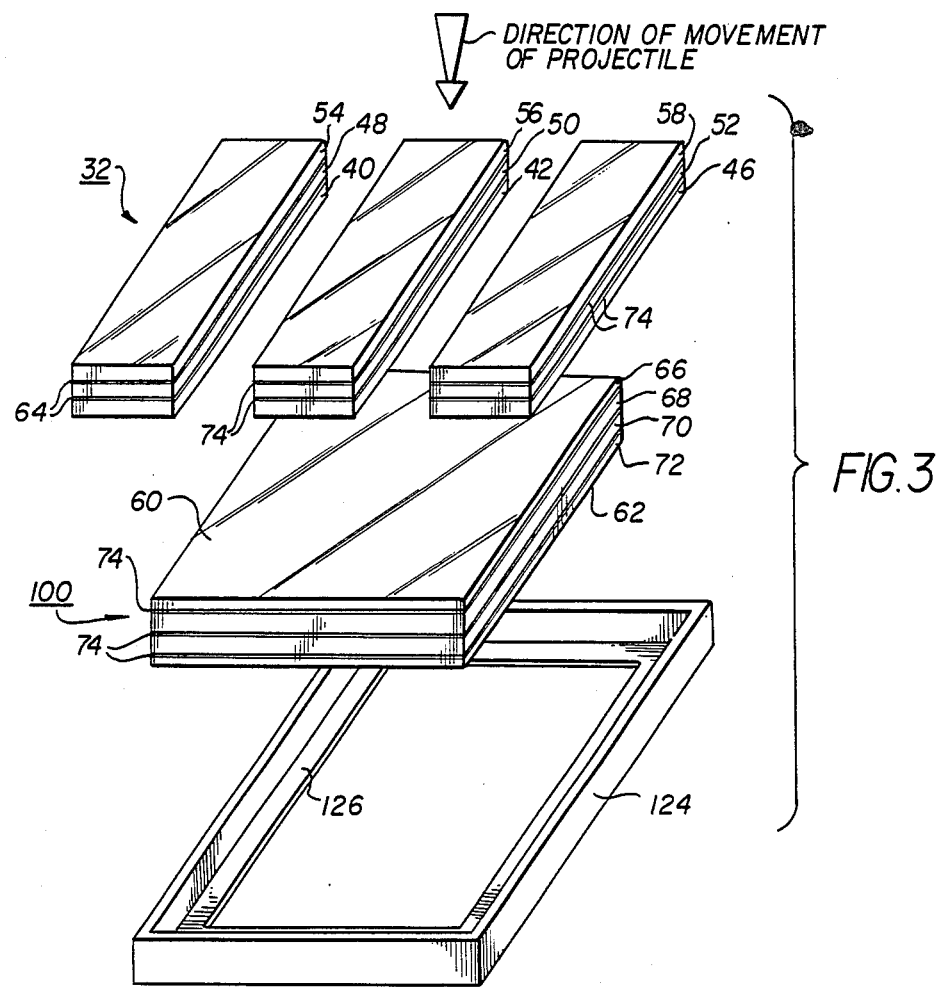

IMPACT RESISTANT GLASS

This invention relates to transparent laminates, and more particularly, to laminated window structures having high impact resistance and low crack propagation.

Impact resistant glass structures are designed to afford protection against impact by various external objects, such as stones, balls, birds, and various other projectiles. It is generally desirable that these structures also be resistant to abrasion, chemical deterioration, and thermal damage, as well as conforming to an acceptable weight limit. Typically, such impact resistant structures are laminates having a continuous outer protective sheet of glass or an acrylic-based plastic, and inner layers of a polymeric material, such as a polycarbonate. The layers are adhesively attached to each other by the use of a transparent interlayer material. For instance, in U.S. Pat. No. 4,081,581, a laminated windshield is disclosed, having a continuous outer protective sheet of glass or acrylic, and a plurality of thin, transparent sheet members of polycarbonate resin, with elastomeric resinous interlayers disposed between and bonded to the sheet members and between the outer protective sheet and the adjacent sheet member. While such a structure may provide high impact resistance, a serious problem arises when the continuous outer layer, i.e. the layer first contacted by a projectile, is made of glass. The entire surface of the glass often cracks excessively when hit by a projectile, thereby greatly reducing the visibility possible through the window structure. The loss of vision defeats the purpose of the window structure and may very well result in the discontinuation of activities which require unobstructed vision through the window structure.

OBJECTS OF THE INVENTION

Accordingly, it is the primary object of the present invention to provide window structures which overcome the foregoing disadvantages.

It is another object of the present invention to provide a window structure having a high degree of impact resistance.

It is still another object of the present invention to provide a window structure which retains substantial areas of visibility after being hit by a projectile.

Still another object of the present invention is to provide a window structure having high impact resistance, along with a high degree of abrasion resistance, chemical resistance, thermal resistance, and a high degree of post-impact visibility.

SUMMARY OF THE INVENTION

The foregoing objects are generally achieved by a transparent laminated window structure having high impact resistance, wherein the window comprises a continuous inner layer of thermoplastic material including first and second substantially parallel surfaces; and an outer layer substantially parallel to the inner layer, the outer layer including at least a first course of discrete, mutually spaced glass segments of uniform thickness each having a surface facing the first surface, the spaces between adjacent segments containing an adhesive material.

The thermoplastic material which forms the inner layer is generally a polycarbonate, while the glass segments are typically safety glass. The window structure may further comprise a strip of elastomeric material compressed between the inner and outer layers and bordering the joint perimeter of the layers, the compressed thickness of the strip defining a gas gap between the layers. Also, the window structure may be provided with a supporting frame surrounding and attached to the joint perimeter formed by the inner and outer layers, the frame further including a ledge underlying and attached to the second surface of the inner layer.

In a preferred embodiment of the present invention, the outer layer comprises safety glass consisting of three superposed courses of substantially identical, mutually spaced glass segments each having the shape of a right parallelepiped, the superposed courses being adhesively attached to each other by a bonding material. Furthermore, in the preferred embodiment, the outer layer and inner layer are separated by the above-mentioned gas gap, and the adhesive material between adjacent glass segments extends through the gas gap to bond to the first surface of the inner layer. In this embodiment, a projectile contacting a glass segment in the outer layer will fracture that segment, but will not cause cracking in the adjacent mutually spaced segments in the same course, and will not penetrate the inner layer. Thus, a high degree of visibility will be retained in the window structure after impact by the projectile.

In another embodiment of the present invention, the outer layer includes at least a second course of discrete, mutually spaced glass segments of uniform thickness overlying the first course segments and adhesively bonded thereto. Furthermore, the outer layer may include a third course of discrete, mutually spaced glass segments of uniform thickness overlying the second course and adhesively bonded thereto, each segment of the second and third courses respectively being positioned so as to straddle a plurality of segments of the course below. In this alternative embodiment, a projectile contacting a glass segment in the third course may crack that particular segment, but adjacent, mutually spaced segments will not exhibit a significant amount of cracking. Furthermore, although underlying segments in the second and first courses may exhibit some cracking when a particular overlying third course segment is contacted by a projectile, the remaining second and first course segments will generally remain crack-free. A substantial degree of visibility will thus be retained after impact by a projectile, and furthermore, the window structure will prevent the projectile from passing through the inner layer.

In another alternative embodiment of the present invention, the inner and outer layers are not separated by a gas gap, but instead may be bonded to each other by an adhesive interlayer material between the mutually facing surfaces of the layers.

BRIEF DESCRIPTION OF THE DRAWINGS

FIG. 1 is a perspective view of an impact resistant window structure of the prior art.

FIG. 3 is a perspective, exploded view of a preferred embodiment of the present invention, in which the window structure includes mutually spaced glass segments.

DETAILED DESCRIPTION OF THE INVENTION

Figure 2:
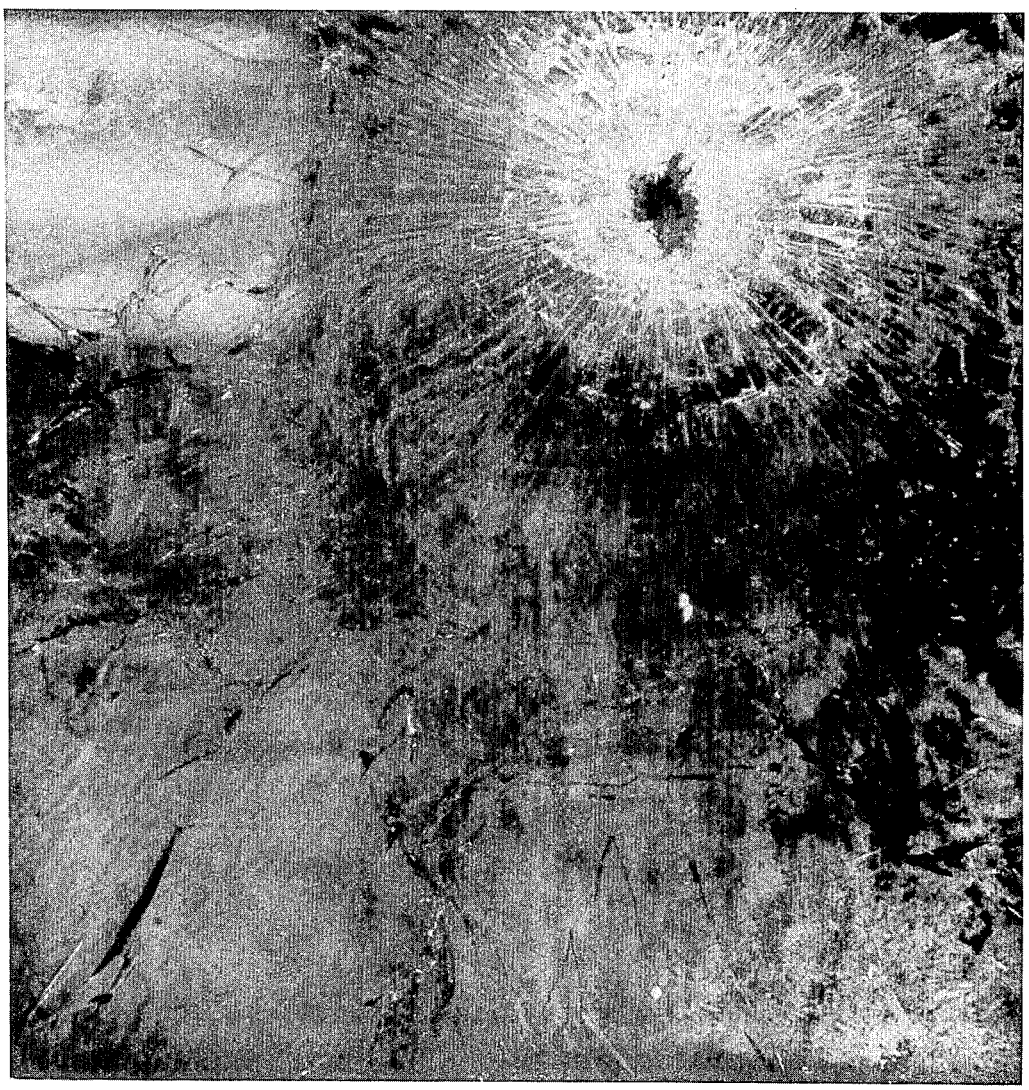
FIG. 2 is a top view photograph of the impact resistant window structure of FIG. 1 after being contacted by a projectile.

The transparent laminated window structure of the present invention includes a continuous inner layer of a thermoplastic material. Several types of thermoplastics may be used to form such a layer, such as polycarbonates, (meth)acrylic polymers, and polyamides. An example of a suitable (meth)acrylic polymer is poly(methyl methacrylate). Examples of suitable polyamides are described in U.S. Pat. No. 3,658,636. The polycarbonates are particularly preferred materials for the inner layer of the window structure. Typical examples of polycarbonate resins are described in U.S. Pat. No. 4,351,920, and are generally obtained by the reaction of aromatic dihydroxy compounds with phosgene or with carbonate precursors such as diaryl carbonates. U.S. Pat. No. 4,351,920 also describes various methods for the preparation of polycarbonate resins which may be used for the inner layer of the present invention. Polycarbonate materials such as Lexan ® resin, a product of General Electric Company, have good abrasion resistance and are not readily susceptible to chemical degradation. The polycarbonates are generally available in transparent form and are optically acceptable for bonded laminates.

The glass used to form the outer layer segments of the structure of the present invention may be any type of oxide glass commonly used in the preparation of glass laminates, such as soda glass, plate glass, optical glass, window glass, silica glass, translucent glass, ground glass, silicate glass and the like. Furthermore, chemically tempered glass, thermally tempered glass, and other types of treated glass are suitable for the present invention and are available commercially through such companies as PPG Industries and Corning Glass Works. A well-known and particularly preferred type of glass for the present invention is safety glass, as described in The Condensed Chemical Dictionary, 10th Edition, Van Nostrand Reinhold Company, 1981. Safety glass typically comprises at least two sheets of plate glass bonded together with a bonding material such as polyvinyl butyral. Safety glass may in fact comprise any number of glass sheets, each additional sheet attached to an adjacent sheet by means of the bonding material. The bonding material prevents shattering of the glass on impact. Other suitable bonding materials are described in U.S. Pat. No. 4,328,277, and may be formed, for example, from other vinyl resins, as well as from polyurethanes, silicones, ethylene terpolymers, epoxies, acrylics, and ethylene acrylic acids, among others. Furthermore, any other bondable material which exhibits good tensile strength retention and embrittlement resistance over a relatively wide range of temperatures is also within the contemplation of this invention.

The adhesive material between adjacent segments may comprise any of the bonding materials described above. A particularly suitable adhesive material is a silicone rubber such as a room temperature-vulcanizing rubber (RTV). The RTV silicone rubber has good physical properties, such as resistance to oxidation and weathering, as well as high temperature resistance. The silicone rubbers also exhibit excellent adhesive and lubricity characteristics while also possessing extreme water repellency, thereby permitting their use in harsh exterior weather conditions.

With reference now to the drawings, FIG. 1 is a perspective view of an impact-resistant window structure of the prior art. Such structures typically are located in the wall of some form of enclosure and permit occupants in the enclosure to see outside while they are protected from the weather elements, etc. A continuous thermoplastic inner layer 8 is typically formed from four continuous inner sublayers 10, 12, 14 and 16 which are adhesively bonded to each other by adhesive interlayers 11, 13 and 15. Glass sheets 18, 22 and 26 are adhesively attached to each other by bonding layers 20 and 21 to form an outer layer 28 of safety glass which initially absorbs the impact force of a projectile moving in the direction of the arrow in FIG. 1. Typically, a strip of elastomeric material (not shown) is compressed between portions of the inner and outer layers to define an air gap 17. The window structure of FIG. 1 generally prevents a projectile from penetrating the inner layer and harming an occupant behind the window. However, while the prior art structure of FIG. 1 may prevent a projectile from fully penetrating the window structure, the projectile will often completely crack the continuous glass sheets and thereby greatly diminish the visibility through the window structure, as shown in FIG. 2 and described below.

FIG. 3 is a perspective, exploded view of the preferred embodiment of the present invention. For the purpose of clarity, the elastomeric lining and the adhesive joint material between each mutually spaced segment have been omitted from FIG. 3; both items are depicted in other figures and are described below. In this preferred embodiment of the present invention, outer layer 32 includes three courses of discrete, mutually spaced glass segments of uniform thickness. Segments 40, 42 and 46 are spaced from each other by an adhesive joint material (not shown) to form a first course; segments 48, 50 and 52 are similarly spaced to form a second course; and segments 54, 56 and 58 form a third course, with the adhesive joint material therebetween (not shown). It is preferred in the practice of the present invention that the outer layer comprise safety glass, as described above. Thus, to form safety glass, superposed segments of plate glass may be adhesively attached to each other by a bonding material, preferably a vinyl resin such as polyvinyl butyral. In FIG. 3, segments 54, 48 and 40 are superposed and are adhesively attached to each other by bonding material 64. The other glass segments in FIG. 3 are similarly adhesively attached to each other. Thus, the superposition of the segments and their mutually spaced position relative to other segments will allow the segments to bend, crack and shatter independently of any of the other mutually spaced glass segments upon impact by a projectile, as further described below.

The number of superposed glass segments and the thickness of each segment will depend on the end use contemplated for the window structure. For instance, small projectiles such as stones could be effectively prevented from penetrating the window structure if the structure were only to include a first course of glass segments, each segment having a thickness of as little as about 0.2 inch. Furthermore, the thickness and number of segments will also depend on the thickness of inner layer 100, described below. Typically, the thickness of outer layer 32 may range from about 0.06 inch to about 2.0 inches, and the thickness of the bonding material layer 64 is typically about 0.05 inch to about 0.2 inch.

Although it is preferred that each glass segment be in the shape of a right parallelepiped as depicted in FIG. 3, the segments are not restricted to such a shape and may instead be in the shape of cylinders whose flat surfaces are parallel to first surface 60, for instance. Furthermore, each course may comprise any number of glass segments greater than one. For instance, while the first course in FIG. 3 is formed from three segments 40, 42 and 46, the course might also be formed from nine segments, each having an area one-third the area of segments 40, 42 and 46. Each of the nine segments might also have a number of superposed segments adhesively attached thereto. Furthermore, it will be apparent to those skilled in the art that the entire outer layer of glass (as well as the inner layer of thermoplastic) may be curve-shaped to form a curve-shaped window structure, where desirable.

The adhesive material used in the spaces between adjacent segments of the window structure of the present invention is typically a silicone rubber compound such as RTV, described above. Such a material must be chemically compatible with the thermoplastic material forming inner layer 100 of the window structure, and is typically translucent. The adhesive joint material is generally compliant and therefore absorbs some of the shock caused by a projectile hitting any of the glass segments. Thus, a segment contacted by a projectile may crack, but the impact force will be minimized in traveling across the adhesive joint material to a spaced adjacent segment. Cracking in the adjacent segment will thus be minimized. The width of the spaces containing the adhesive joint material is typically from about 0.001 inch to about 0.5 inch. The silicone rubber materials which may comprise the joint material generally cure at room temperature.

With further reference to FIG. 3, there is depicted a continuous inner layer 100 of thermoplastic material including first and second substantially parallel layer surfaces 60 and 62, respectively. The thermoplastic material may comprise any of the materials described above. Although it is within the scope of the present invention to provide a window structure wherein inner layer 100 has only one sublayer, it is preferred that the inner layer have four superposed continuous thermoplastic sublayers 66, 68, 70 and 72 of equal area wherein the first and last sublayers 66 and 72, respectively, include the first and second surfaces, respectfully, of inner layer 100. The sublayers are bonded to each other by adhesive interlayer material 74. Four layers of polycarbonate are used in the preferred embodiment because they provide a greater degree of strength in comparison to the use of only one layer of polycarbonate. Furthermore, each layer may be chemically modified to suit particular requirements of the inner layer. For instance, first and last sublayers 66 and 72 may be provided with an additive to increase abrasion resistance by increasing the hardness of the thermoplastic material as compared to the sublayers therebetween. Thus, the sublayers would be less susceptible to scratches and pits caused by contact with glass fragments or other objects.

The adhesive interlayer material which bonds together the sublayers of inner layer 100 may be any suitable adhesive which is compatible with the polycarbonate polymer. A particularly preferred interlayer material for use in bonding sublayers 66, 68, 70 and 72 is a polycarbonate-polysiloxane block copolymer. These block copolymers generally have recurring units of a polydiorganosiloxane interconnected by substituted acryloxy-silicon linkages to a polyester of a carbonic acid precursor and a dihydric phenol, as described in U.S. Pat. No. 3,189,662. They may be used alone or in conjunction with well-known modifiers to provide or enhance certain desired characteristics, such as tensile strength, elongation, heat deflection temperature and brittleness temperature. Examples of such block copolymers are General Electric's LR-3320 and LR-5530. The thickness of the adhesive interlayer material is not critical to the present invention, and typically ranges from about 0.05 inch to about 0.2 inch. Furthermore, it will be understood by those skilled in the art that inner layer 100 may have any number of sublayers, depending upon the level of penetration resistance desired in the window structure.

Figure 4:
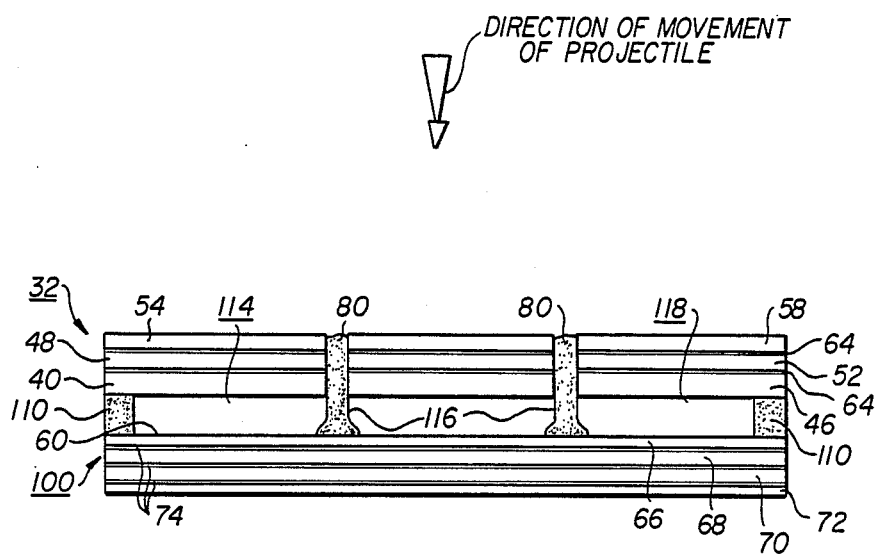
FIG. 4 is an edge view of an embodiment of the present invention which includes mutually spaced glass segments and a gas gap in the structure.

With reference now to FIG. 4, there is depicted an edge view of a preferred embodiment of the present invention which encompasses the structure of FIG. 3 (though omitting frame 124, discussed below). As in FIG. 3, there are depicted three courses of superposed, mutually spaced glass segments, the courses being adhesively attached to each other by bonding material 64. The spaces between adjacent segments in the same course are filled by an adhesive material 80, as described above. Furthermore, inner layer 100 has four superposed continuous thermoplastic sublayers 66, 68, 70 and 72 bonded to each by the adhesive interlayer material 74. In this preferred embodiment of the present invention, a strip of elastomeric material 110 is compressed between inner layer 100 and outer layer 32 and borders the joint perimeter of the layers, the compressed thickness of the strip 110 defining a gas gap 114 between the layers. "Joint perimeter" as used herein is defined as the peripheral region of the first surface of the inner layer and the corresponding peripheral region of the outer layer surface facing the first surface of the inner layer, and is clearly depicted in FIG. 6 as the peripheral region of each layer which contacts lining 110. Gas gap 114 generally has a depth of from about 0.001 inch to about 3.0 inches when the outer layer has a total thickness of about 0.75 inch and the inner layer has a thickness of about 1.0 inch. The gap may be filled with dry air, dry nitrogen, or various inert gases. Although gas gap 114 is not critical to the present invention, its presence is desirable in those instances in which the window structure will be exposed to alternating high temperature and low temperature environments which might cause warpage of layers 32 and 100. The gas gap allows for the bending of layers 32 and 100 toward each other or away from each other, thereby preventing the weakening of the window structure when exposed to such temperature variables.

As further depicted in FIG. 4, adhesive material 80 extends through the gas gap to bond to the first surface 60 of the inner layer, thereby forming gas gap walls 116. Each wall 116 defines gas gap chambers 118 which serve a particular function now described. As one or more of the glass segments 40, 42 and 46 of the first course cracks or breaks upon impact by a projectile, portions of the segment may spall. Small fragments of glass, as well as powder-like glass particles, may be trapped in gas gap 114. These residual materials might normally spread through the gas gap, thereby obstructing the vision of an occupant behind the structure. Gas gap walls 116 prevent the spread of these materials by trapping them in the gas gap chamber immediately beneath the particular segment which has spalled. Thus, vision through the remainder of the window structure remains unobstructed. It will be understood by those skilled in the art that elongated barrier elements may be placed in the gas gap chambers perpendicular to or parallel with (or in place of) gas gap walls 116. The barrier elements would be made of materials impervious to glass fragments, such as plastic or hard silicone rubber, and would act as an additional impediment to the movement of vision-obstructing glass fragments or dust. Furthermore, the spaces between mutually spaced segments might contain plastic or hard rubber inserts enveloped in the adhesive joint material, if desired.

With further reference to FIG. 4, elastomeric material 110 is typically a synthetic rubber-like compound, e.g., a butyl rubber. For instance, a copolymer of isobutylene and isoprene which has high tensile strength, and is resistant to abrasion, aging deficiencies, sunlight, and moisture, while also having superior shock absorbence and vibration absorbence, is particularly suitable. Other materials which may be used include silicone rubbers, as well as natural rubbers, with the proviso that the material be chemically compatible with thermoplastic inner layer 100.

Figure 5:
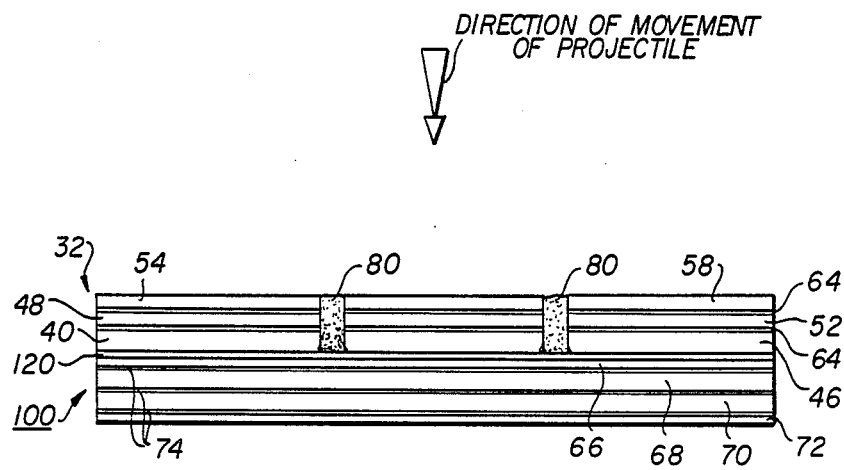
FIG. 5 is a edge view of an alternative embodiment of the present invention which includes mutually spaced glass segments, but excludes a gas gap.

In those instances when a gas gap is deemed unnecessary, the inner and outer layers 100 and 32, respectively, may be bonded to each other by an adhesive interlayer material 120 between the mutually facing surfaces of the layers, as depicted in FIG. 5. Adhesive interlayer material 120 may be any adhesive composition which is chemically compatible with the thermoplastic material of inner layer 100, such as the polycarbonate-polysiloxane block copolymer discussed above. In this embodiment of the present invention, adhesive material 80 will extend only as far as the surface of adhesive interlayer material 120 and will bond thereto, as depicted in FIG. 5.

With reference to FIG. 3, the window structure of the present invention may further include a supporting frame 124 (shown in the exploded view in FIG. 3) surrounding and attached to the joint perimeter formed by the inner and outer layers 32 and 100, the frame further including a ledge 126 underlying and attached to second surface 62 of the inner layer. Such a frame is well-known in the art, and is typically made of aluminum or steel. Frame 124 may be attached to the window structure by many well-known methods. Alternatively, frame 124 may initially be bolted into the wall of the enclosure. The window structure might then be sealed against the ledge 126 of the frame by caulking materials. The particular method of attaching the window structure to the frame is not critical to the present invention and may depend in part upon the end use desired for the window structure.

The window structure of the present invention has several outstanding characteristics or properties. First, the structure exhibits high impact resistance, i.e., projectiles may penetrate a portion of the window structure, but will not pass through the structure to harm occupants or equipment in the interior of the enclosure. For instance, in FIG. 3, a stone may penetrate a portion of outer layer 32, but much of the kinetic energy of the moving stone will be transmitted to and absorbed by the particular glass segment receiving the impact. By the time the stone reaches gas gap 114, its velocity has been significantly decreased so that it does not have the force necessary to fully penetrate inner layer 100. Likewise, a metal ammunition round hitting a glass segment in the outer layer may crack or fracture the segment, but will itself be distorted into a spherical or flat shape. By the time the round contacts inner layer 100, it will not have enough remaining kinetic energy to pierce the inner layer.

Figure 6:
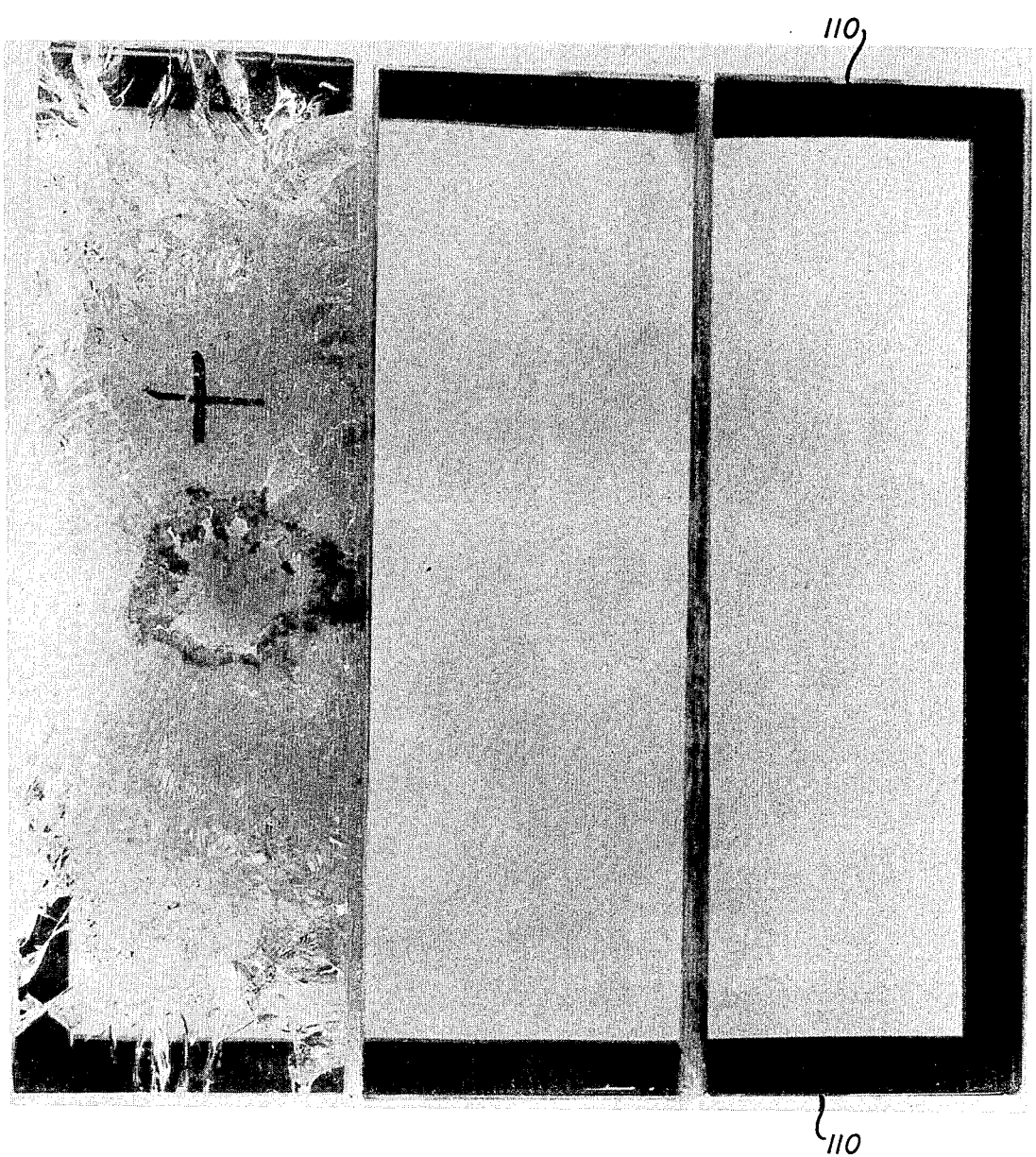
FIG. 6 is a top view photograph of a preferred embodiment of the present invention after being hit by a projectile.

A second outstanding characteristic of the window structure of the present invention is that each glass segment in the outer layer 32 reacts independently of the adjacent, mutually spaced segments. Thus, when a projectile hits a particular segment, the segment may crack, bend, and deflect independently of the other segments. Crack propagation across adhesive joint material 80 to adjacent mutually spaced segments is thereby minimized, as shown in FIG. 6, discussed below. If a projectile directly hits an adhesive joint or space, cracks may appear in each segment separated by the space, but crack propagation is minimized. Furthermore, segments which are not adjacent to a particular space which has been hit by a projectile will generally not exhibit any cracking. As described below in the examples, the window structure of the prior art, which does not include discrete, mutually spaced glass segments, exhibits cracking throughout the entire glass surface of the window structure, thereby greatly decreasing visibility through the structure.

Figure 7:
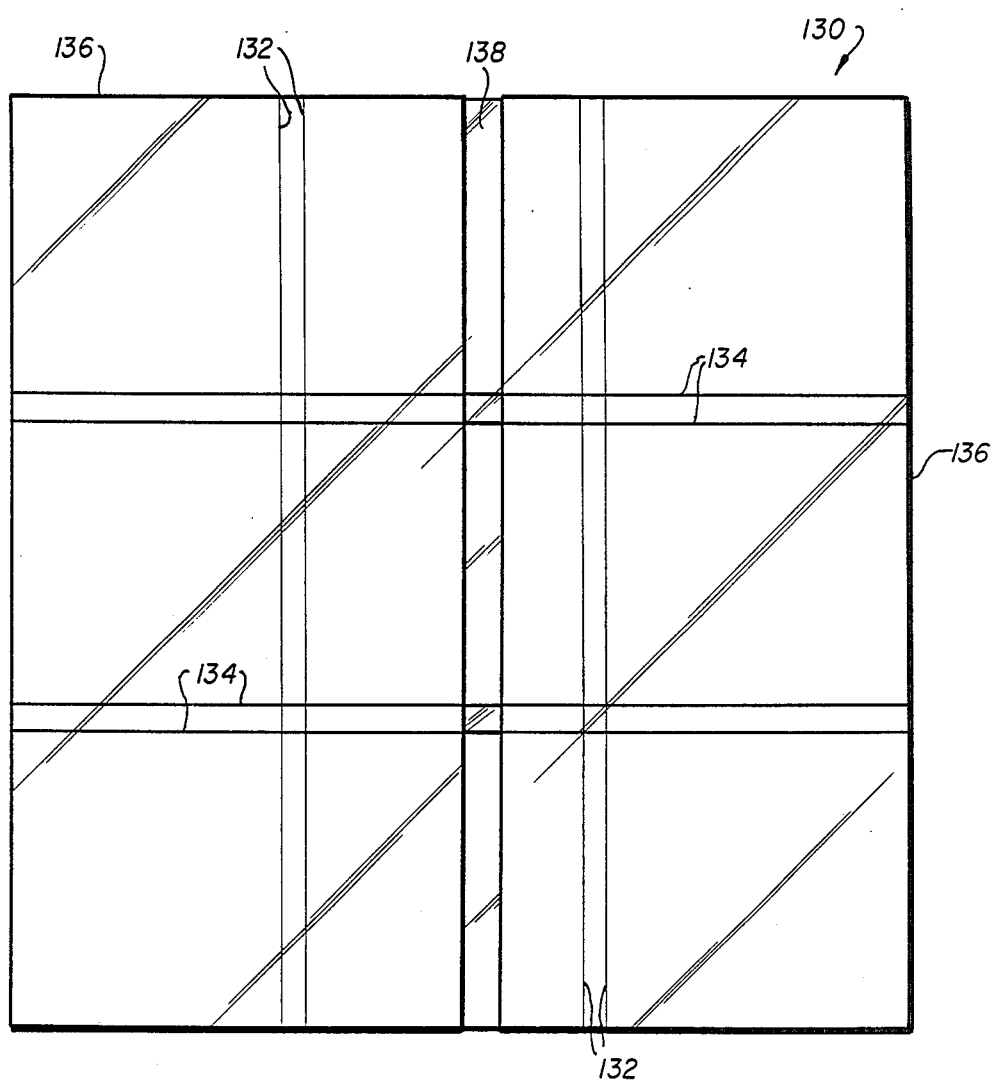
FIG. 7 is a top view of another alternative embodiment of the present invention, in which the outer layer of the window structure includes three courses of mutually spaced glass segments.

An alternative embodiment of the window structure of the present invention is partially depicted in FIG. 7, which provides a top view of the window structure, i.e., looking at the structure from the source of a projectile. Outer layer 130 may include three courses of glass segments. The first course of discrete, mutually spaced glass segments 132 are of generally uniform thickness and each has a surface facing the first surface of the inner layer (not shown), as in the preferred embodiment of the present invention. The outer layer may further include at least a second course of discrete, mutually spaced glass segments 134 of uniform thickness overlying the first course segments 132 and adhesively bonded thereto. Although the segment surfaces parallel to the inner layer (not shown) have equal areas within a given course, it is not necessary for the segments in each course to have equal areas. Furthermore, the surface areas of the second course segments 134 may all be smaller or larger than the surface areas of the first course segments 132, if desired. As is further depicted in FIG. 7, an especially preferred alternative embodiment includes a third course of discrete, mutually spaced glass segments 136 of uniform thickness overlying the second course and adhesively bonded thereto. Furthermore, each segment of the second and third course may respectively be positioned so as to straddle a plurality of segments of the course below. The straddling of glass segments, which are each typically in the shape of a right parallelepiped, may enhance the fatigue strength of the window structure. The amount of overlap of the straddling segments is not critical to the present invention and will depend upon the end use of the structure. For example, a larger overlap may be desired in those instances where the window may be subjected to greater impact forces.

In this alternative embodiment of the present invention, the adhesive material contained in the spaces between adjacent, mutually spaced glass segments may be identical to that used in the preferred embodiment described above. Furthermore, the inner and outer layers may be bonded to each other by an adhesive interlayer material between the mutually facing surfaces of the layers, or alternatively, a strip of elastomeric material may be compressed between the layers to define a gas gap, as in the preferred embodiment described above. Moreover, the glass segments of this alternative embodiment may comprise all types of glass used in the preferred embodiment of the present invention. Similarly, the inner layer may comprise any of the types of materials used for the inner layer of the preferred embodiment. Furthermore, the supporting frame used for the preferred embodiment of the present invention is of course suitable for these alternative embodiments.

With further reference to FIG. 7, it is apparent that a projectile hitting a particular third course segment 136 may cause the segment to crack or shatter. However, crack propagation across third course space 138 (containing an adhesive material-not shown) will be minimized, in part due to the shock absorbence characteristics of the adhesive material Furthermore, while the projectile moving into particular underlying second and first course segments may cause those segments to crack or shatter, the visibility will be retained through undamaged, mutually spaced segments which are not underneath segments which have been hit by the projectile. Furthermore, although the bending of a third course segment 136 may cause some secondary cracking to underlying second and first course segments 134 and 132, secondary crack propagation will also be greatly impeded by the spaced arrangement of the segments in each course.

The following specific examples describe the novel articles of the present invention. They are intended for illustrative purposes of specific embodiments only and should not be construed as a limitation upon the broadest aspects of the invention.

EXAMPLES

Two samples were prepared for impact testing. Sample 1 is a prior art window structure outside the scope of the present invention, depicted in FIG. 1 and utilized here for the purpose of comparison. Sample 1 included an outer layer of safety glass, product No. 1C534 of the Insulguard Corporation, having a thickness of approximately 0.75 inch. The outer layer had three continuous sheets of plate glass adhesively attached to each other by a bonding material. The third sheet, i.e., the sheet farthest away from the inner layer, had an approximate thickness of slightly less than 0.12 inch. The first sheet had approximately the same thickness, while the middle sheet had an approximate thickness of slightly less than 0.5 inch. The inner layer had four superposed thermoplastic sublayers of LEXGARD ® polycarbonate laminate GC-938, and had a thickness of about 1.0 inch. All of the inner sublayers were adhesively attached to each other, and the two outermost sublayers were harder than the intervening sublayers. A strip of butyl rubber compressed between the inner and outer layers and bordering their joint perimeter served to define a gas gap of about 0.25 inch between the layers. The entire window structure had an area of about 12 inches×12 inches.

The window structure of sample 2 was within the scope of the present invention and had an area of about 12 inches×12 inches. The outer layer had three courses of superposed, mutually spaced glass segments, and the thickness of each segment in the third course was equal to the thickness of the third glass sheet of the window structure of sample 1. The segments in the second and first courses also had thicknesses which were, respectively, substantially identical to the thicknesses in the middle and first sheets of glass for the structure of sample 1. The safety glass composition was substantially identical to that of sample 1. The inner layer of sample 2 was also identical to that of sample 1. Sample 2 was provided with a gas gap of about 0.25 inch. The spaces between adjacent mutually spaced segments were filled with RTV and each had a thickness of about 0.125 inch.

A 7.62 mm ball round was used as the projectile for impact tests. The projectile had a weight of about 0.02 pounds and was formed of a lead material having a copper jacket. One projectile was fired at each sample from a distance of approximately 10 feet. The outer layer of each window structure received the initial impact of the projectile. The projectile failed to penetrate both samples 1 and 2. However, as depicted in FIG. 2, which is a top view of the prior art window structure of sample 1 after impact, the structure exhibited severe crack propagation. The area of visibility through the window structure after impact was less than 15% of the area of visibility prior to impact by the projectile, and crack propagation was evident throughout the glass layer.

FIG. 6 depicts a top view of sample 2 after impact by the projectile. A high degree of visibility was possible through the window structure after impact by the projectile, in marked contrast to the prior art structure of sample 1. As depicted in FIG. 6, while one set of superposed segments exhibited crack propagation, the remaining adjacent, mutually spaced segments remained crack-free. Thus, visibility after impact by the projectile was approximately 67% of the visibility prior to impact.

While the invention has been described with respect to preferred embodiments, it will be apparent to those skilled in the art that certain modifications and changes can be made without departing from the spirit and scope of the invention and, therefore, it is intended that the foregoing disclosure be limited only by the claims appended hereto.

What is claimed is:

1. A transparent laminate having high impact resistance and low crack propagation comprising:
   a continuous inner layer comprised of thermoplastic material including first and second substantially parallel surfaces; and
   an outer layer comprised of glass facing the direction of impact substantially parallel to the inner layer, the outer layer comprised of at least a first course comprising a plurality of discrete, mutually spaced glass segments of uniform thickness, each having a surface facing the first surface of said inner layer, the spaces between adjacent segments containing an adhesive material.

2. The laminate of claim 1 wherein the adhesive material comprises a silicone rubber.

3. The laminate of claim 1 and further comprising a strip of elastomeric material compressed between the inner and outer layers and bordering the joint perimeter of the layers, the compressed thickness of the strip defining a gas gap between the layers.

4. The laminate of claim 3 wherein the adhesive material extends through the gas gap to bond to the first surface of the inner layer.

5. The laminate of claim 1 wherein the thermoplastic material is poly(methyl methacrylate).

6. The laminate of claim 1 wherein the thermoplastic material is a polycarbonate.

7. The laminate of claim 6 wherein the polycarbonate is formed from the reaction of phosgene with bisphenol A.

8. The laminate of claim 1 wherein the inner and outer layers are bonded to each other by an adhesive interlayer material between the mutually facing surfaces of the layers.

9. The laminate of claim 8 and further including a supporting frame surrounding and attached to the joint perimeter formed by the inner and outer layers, the frame further including a ledge underlying and attached to the second surface of the inner layer.

10. The laminate of claim 8 wherein the adhesive interlayer material comprises a polycarbonate-polysiloxane block copolymer.

11. The laminate of claim 10 wherein the inner layer comprises four superposed continuous thermoplastic sublayers of equal area containing a first outer sublayer which includes said first surface of said inner layer and a second outer sublayer which includes said second surface of said inner layer, the sublayers being bonded to each other by the adhesive interlayer material.

12. The laminate of claim 11 wherein the first and last sublayers comprise a harder thermoplastic material than do the sublayers therebetween.

13. The laminate of claim 1 wherein the outer layer includes at least a second course of discrete, mutually spaced glass segments of uniform thickness overlying the first course segments and adhesively bonded thereto.

14. The laminate of claim 13 wherein each segment has the shape of a right parallelepiped.

15. The laminate of claim 14 wherein the segment surfaces parallel to the first layer have equal areas within a given course, the surface areas of the second course segments being smaller than those of the first course segments.

16. The laminate of claim 14 wherein the segment surfaces parallel to the first layer have equal areas within a given course, the surface areas of the second course segments being larger than those of the first course segments.

17. The laminate of claim 14 wherein the outer layer includes a third course of discrete, mutually spaced glass segments of uniform thickness overlying the second course and adhesively bonded thereto, each segment of the second and third course respectively being positioned so as to straddle a plurality of segments of the course below.

18. The laminate of claim 1 wherein the outer layer comprises safety glass.

19. The laminate of claim 18 wherein the safety glass consists of three superposed courses of substantially identical, mutually spaced glass segments each having the shape of a right parallelepiped, the superposed courses being adhesively attached to each other by a bonding material.

20. The laminate of claim 19 wherein the bonding material comprises a vinyl resin.

21. The laminate of claim 20 wherein the vinyl resin is polyvinyl butyral.

22. The laminate of claim 21 and further comprising a strip of elastomeric material compressed between the inner and outer layers and bordering the joint perimeter of the layers, the compressed thickness of the strip defining a gas gap between the layers.

* * * * *